United States Patent
Myllymäki et al.

(10) Patent No.: US 10,836,930 B2
(45) Date of Patent: Nov. 17, 2020

(54) METHOD FOR PRODUCING ZETA NEGATIVE NANODIAMOND DISPERSION AND ZETA NEGATIVE NANODIAMOND DISPERSION

(71) Applicant: Carbodeon Ltd. Oy, Helsinki (FI)

(72) Inventors: Vesa Myllymäki, Helsinki (FI); Jesse Syrèn, Helsinki (FI)

(73) Assignee: Carbodeon Ltd. Oy, Helsinki (FI)

( * ) Notice: Subject to any disclaimer, the term of this patent is extended or adjusted under 35 U.S.C. 154(b) by 177 days.

(21) Appl. No.: 15/916,406

(22) Filed: Mar. 9, 2018

(65) Prior Publication Data
US 2018/0194968 A1    Jul. 12, 2018

Related U.S. Application Data

(63) Continuation of application No. 14/785,694, filed as application No. PCT/FI2014/050290 on Apr. 22, 2014, now Pat. No. 9,994,738.

(30) Foreign Application Priority Data

Apr. 23, 2013    (FI) ..................... 20135416

(51) Int. Cl.
*C09G 1/04* (2006.01)
*C01B 32/15* (2017.01)
(Continued)

(52) U.S. Cl.
CPC ............... *C09G 1/04* (2013.01); *B01J 13/00* (2013.01); *C01B 32/15* (2017.08); *C01B 32/25* (2017.08);
(Continued)

(58) Field of Classification Search
CPC ........... C09G 1/04; C01B 32/15; C01B 32/25; C01B 32/28; C10M 125/02;
(Continued)

(56) References Cited

PUBLICATIONS

Plasmachem Additional Product Information for SDND™ single-digit nanodiamonds, dated Jan. 14, 2011, supplied by applicant on Dec. 18, 2015 and available from the internet at <http://www.plasmachem.com/shop/en/attachnnent.php?id_attachment=168> (Year: 2011).*

(Continued)

*Primary Examiner* — James C Goloboy
(74) *Attorney, Agent, or Firm* — Berggren LLP

(57) ABSTRACT

The present invention relates to a method for producing zeta negative single digit carboxylated nanodiamond dispersion. The method comprises adjusting pH of zeta negative carboxylated nanodiamond suspension to at least 7, and subjecting the pH adjusted suspension to beads milling. The present invention further relates to zeta negative single digit carboxylated nanodiamond dispersion comprising zeta negative single digit carboxylated nanodiamond particles and a liquid medium, wherein zeta potential of the zeta negative single digit carboxylated nanodiamond dispersion is over −37 mV measured at pH over 7, zeta negative single digit carboxylated nanodiamond particle concentration in the dispersion is over 2 wt-% and D90 average primary particle size distribution of the zeta negative single digit carboxylated nanodiamond particles is from 2 nm to 12 nm.

10 Claims, 6 Drawing Sheets

(51) Int. Cl.
    *C01B 32/25*     (2017.01)
    *C10M 125/02*     (2006.01)
    *C01B 32/28*     (2017.01)
    *B01J 13/00*     (2006.01)
    *C10M 129/26*     (2006.01)
    *C25D 3/02*     (2006.01)

(52) U.S. Cl.
    CPC ........... *C01B 32/28* (2017.08); *C10M 125/02* (2013.01); *C10M 129/26* (2013.01); *C25D 3/02* (2013.01); *C01P 2004/64* (2013.01); *C10M 2201/041* (2013.01)

(58) Field of Classification Search
    CPC . C10M 129/26; C10M 2201/041; C25D 3/02; B01J 13/00; C01P 2004/64

See application file for complete search history.

(56) References Cited

PUBLICATIONS

Liang, Y., Ozawa, M., Krueger, A., "A General Procedure to Functionalize Agglomerating Nanoparticles Demonstrated on Nanodiamond", ACS Nano, vol. 3, No. 8, pp. 2288-2296, 2009 (Year: 2009).*
Hannstein, I., Adler, A.-K., Lapina, V., Osipov, V., Opitz, J., Schreiber, J., Meyendorf, N., "Chemically activated nanodiamonds for aluminum alloy corrosion protection and monitoring", Proc. SPIE 7293, Smart Sensor Phenomena, Technology Networks and Systems 2009, 72930 (Year: 2009).*
Ozawa, M., Inaguma, M., Takahashi, M., Kataoka, F., Kruger, A., Osawa, E., "Preparation and Behavior of Brownish, Clear Nanodiamond Colloids", Adv. Mater., 2007, 18, 1201-1206 (Year: 2007).*
Rudolph, M., Peuker, U.A., Hannstein, I., Schreiber, J., Opitz J., "Aqueous colloids of detonation synthesized nanodiamond particles", Hasselt Diamond Workshop—2010 SBDD XV, Hasselt, Belgium (Year: 2010).*
Russian Patent Office, Office Action dated Aug. 7, 2018.
Frolov G., A Course of Colloid Chemistry: Surface Phenomena and Dispersed Systems, 1988. pp. 15-17, Russia.

* cited by examiner

METHOD FOR PRODUCING ZETA NEGATIVE NANODIAMOND DISPERSION AND ZETA NEGATIVE NANODIAMOND DISPERSION

PRIORITY

This application is a continuation application of U.S. Ser. No. 14/785,694, which is a US national application of international application PCT/FI2014/050290, filed on Apr. 22, 2014, and claims priority of Finnish national application number FI20135416 filed on Apr. 23, 2013, contents of all of which are incorporated herein by reference.

FIELD OF THE INVENTION

The present invention relates to a method for producing zeta negative single digit carboxylated nanodiamond dispersion and to zeta negative single digit carboxylated nanodiamond dispersion.

BACKGROUND ART

Nanodiamond (ND) also referred to as ultrananocrystalline diamond or ultradispersed diamond (UDD) is a unique nanomaterial which can easily be produced in hundreds of kilograms by detonation synthesis.

Detonation nanodiamonds (ND) were first synthesized by researchers from the USSR in 1963 by explosive decomposition of high-explosive mixtures with negative oxygen balance in a non-oxidizing medium. A typical explosive mixture is a mixture of trinitrotoluene (TNT) and hexogen (RDX) and a preferred weight ratio of TNT/RDX is 40/60.

As a result of the detonation synthesis a diamond-bearing soot also referred to as detonation blend is obtained. This blend comprises nanodiamond particles, which typically have an average particle size of about 2 to 8 nm, and different kinds of non-diamond carbon contaminated by metals and metal oxide particles coming from the material of the detonation chamber. The content of nanodiamonds in the detonation blend is typically between 30 and 75% by weight.

The nanodiamond-containing blends obtained from the detonation contain same hard agglomerates, typically having a diameter of above 1 mm. Such agglomerates are difficult to break. Additionally the particle size distribution of the blend is very broad.

The diamond carbon comprises spa carbon and the non-diamond carbon mainly comprises $sp^2$ carbon species, for example carbon onion, carbon fullerene shell, amorphous carbon, graphitic carbon or any combination thereof.

There are number of processes for the purification of the detonation blends. The purification stage is considered to be the most complicated and expensive stage in the production of nanodiamonds.

For isolating the end diamond-bearing product, a complex of chemical operations directed at either dissolving or gasifying the impurities present in the material are used. The impurities, as a rule, are of two kinds: non-carbon (metal oxides, salts etc.) and nondiamond forms of carbon (graphite, black, amorphous carbon).

Chemical purification techniques are based on the different stability of the diamond and non-diamond forms of carbon to oxidants. Liquid-phase oxidants offer an advantage over gas or solid systems, because they allow one to obtain higher reactant concentrations in the reaction zone and, therefore, provide high reaction rates.

In the recent years nanodiamonds have received more and more attention due to several existing applications within electroplating (both electrolytic and electroless), polishing, various polymer mechanical and thermal composites, CVD-seeding, oils and lubricants additives as well as possible new applications such as luminescence imaging, drug delivery, quantum engineering etc.

The fact that the available nanodiamond materials possess a variety of various surface functions and thus agglomeration (from several hundreds of nanometers to several microns), is effectively limiting their use in industrial applications. As applying agglomerating nanodiamond grades, very high filler loadings are typically required, making their cost efficient use impossible in most of the applications today. Moreover, nanodiamond agglomeration is effectively limiting or prohibiting the optimization of various application end product technical properties. Agglomeration is making it impossible to use nanodiamonds in applications wherein the product optical properties have to be retained; agglomeration is causing scratching in polishing and fine-polishing applications; agglomeration can have a direct adverse effect on polymer composite mechanical properties; agglomeration in an electroplating electrolyte or electroless deposition chemicals (due to non-optimal nanodiamond zeta potential as in relation to electrolyte pH regime) makes their usage completely impossible for manufacturing mechanically improved metal coatings; agglomeration is effectively prohibiting nanodiamond usage as a drug carrier material; agglomeration is having an adverse effect on CVD produced diamond film quality etc.

Cost efficient and technologically optimized usage of nanodiamond materials both in their powder, suspension and dispersion form can only be achieved if nanodiamonds are substantially mono-functionalized type and have thus, depending on the type of surface modification, the highest possible affinity to various solvents and polymer, metal or ceramic materials. This substantial mono-functionalization should also accomplish the production of single digit nanodiamond dispersions (dispersions wherein nanodiamonds are essentially in their primary particle, agglomerate free form). Such a substantially mono-functionalized nanodiamond possesses, depending on the type of surface functionalization, either a highly positive or negative zeta potential value.

The significance of zeta potential is that its value can be related to the stability of colloidal dispersions. The zeta potential indicates the degree of repulsion between adjacent, similarly charged particles in dispersion. For molecules and particles that are small enough, a high zeta potential will confer stability, i.e., the solution or dispersion will resist aggregation. When the potential is low, attraction exceeds repulsion and the dispersion will break and flocculate. So, colloids with high zeta potential (negative or positive) are electrically stabilized while colloids with low zeta potentials tend to coagulate or flocculate. If the zeta potential is 0 to ±5 mV, the colloid is subjected to rapid coagulation or flocculation. Zeta potential values ranging from ±10 mV to ±30 mV indicate incipient instability of the colloid (dispersion), values ranging from ±30 mV to ±40 mV indicate moderate stability, values ranging from ±40 mV to ±60 mV good stability as excellent stability is reached only with zeta potentials more than ±60 mV.

In order to be technologically viable and cost efficient, nanodiamond single digit dispersions should possess high nanodiamond concentrations. Preferably, nanodiamond concentrations should exceed 2 wt-%. If the concentration is too low, too much of excess solvent has to be added into application processes, having an adverse effect on metal ion and other additive concentration within electroplating, polymer resin content in paints and lacquers changing thus drastically the curing process etc.

Several methods for functionalizing the nanodiamonds with different functional groups have been developed. Typical functionalized nanodiamonds are carboxylated nanodiamonds, hydroxylated nanodiamonds and hydrogenated nanodiamonds, but contain still a mixture of typically oppositely charged functions and thus, mediocre zeta potential values and are thus not available in their solvent dispersion forms.

In prior art, methods, such as beads milling, to produce highly zeta negative, single digit carboxylated nanodiamond dispersions have been proposed. However, the methods have not been very successful.

It is known in the art that when subjecting a highly zeta negative, carboxylated nanodiamond powder to beads milling, a big part of existing surface carboxylic acid functions are subjected to reduction to zeta positive hydroxyl groups. This reduction is having an adverse effect on the material overall zeta potential, and results in severe agglomeration. Eventually the agglomerates clog the beads milling apparatus.

Publication A. Krueger and D. Lang, Adv. Funct. Mater. 2012, 22, 890-906 discloses the phenomena where nanodiamond particles, subjected to a beads assisted sonic disintegration (a method combining beads milling and ultrasonication), become significantly more hydrophilic, zeta potential rises to ~+40 mV (at neural pH) and colloidal solutions of OH terminated nanodiamond particles are obtained. Based on above disclosure, there is a qualitative and quantitative need for an efficient method for producing highly zeta negative single digit carboxylated nanodiamond dispersion and a product thereof.

SUMMARY OF THE INVENTION

The present invention relates to a method for producing zeta negative single digit carboxylated nanodiamond dispersion.

The present invention further relates to zeta negative single digit carboxylated nanodiamond dispersion.

It has now been surprisingly found that by adjusting pH of zeta negative carboxylated nanodiamond suspension into neutral to alkaline region by base additives it is possible to block nanodiamond carboxylic acid functions from chemomechanical reduction to respective hydroxyl groups during beads milling process. As no reduction takes place, the milling can now be carried out without any nanodiamond agglomeration and thus, also clogging is avoided too. As the nanodiamond carboxylic acid functions are protected from said reduction, highly zeta negative single digit carboxylated nanodiamond dispersions in high concentrations can be produced by the beads milling process.

DETAILED DESCRIPTION

Figure 1:
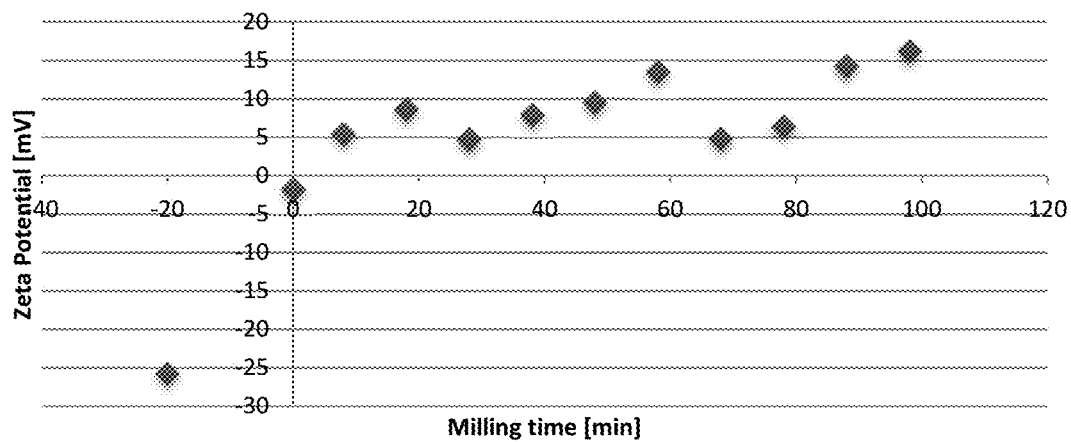
FIG. 1 shows zeta potential of carboxylated nanodiamonds during beads milling according to a reference method.

By term "zeta negative nanodiamond" is meant a nanodiamond particle having a negative zeta potential.

By term "carboxylated nanodiamond" is meant a nanodiamond particle having carboxylic acid functions on its surface.

By term "zeta negative carboxylated nanodiamond" is meant a nanodiamond particle having carboxylic acid functions on its surface and having a negative zeta potential.

By term "zeta negative single digit carboxylated nanodiamond" is meant a nanodiamond particle substantially in its primary particle form having carboxylic acid functions on its surface and having a negative zeta potential.

By term "zeta negative single digit carboxylated nanodiamond dispersion" is meant a dispersion of a liquid medium and nanodiamond particles where the nanodiamond particles are substantially present in their primary particle form and having carboxylic acid functions on theirs surface, and the dispersion having a negative zeta potential.

In a first aspect of the present invention there is provided a method for producing zeta negative single digit carboxylated nanodiamond dispersion.

More particularly there is provided a method for producing zeta negative single digit carboxylated nanodiamond dispersion, the method comprising adjusting pH of zeta negative carboxylated nanodiamond suspension to at least 7, and subjecting the pH adjusted suspension to beads milling.

The zeta negative carboxylated nanodiamond suspension comprises zeta negative carboxylated nanodiamond particles and a liquid medium.

The zeta negative carboxylated nanodiamond particles may be essentially pure nanodiamond particles, preferably having a nanodiamond content of at least 87% by weight, more preferably at least 97% by weight. The carboxylated nanodiamond particles may contain graphite and amorphous carbon originating from the production of the nanodiamonds. They may also contain some residual metal impurities, either as metals or in metal oxide form.

The zeta negative carboxylated nanodiamond particles may be in the suspension in agglomerated form, or as a mixture of agglomerated and single digit form. In one embodiment, the zeta negative carboxylated nanodiamond particles are in single digit form in the liquid medium before the beads milling.

Particle size distribution of the agglomerated suspension form is between 2 nm and 400 nm, preferably between 2 nm and 100 nm.

The zeta negative carboxylated nanodiamond particles are commercially available.

The liquid medium of the suspension may be any suitable liquid medium. The liquid medium is preferably selected from the group consisting of polar protic solvents, polar aprotic solvents, dipolar aprotic solvents, ionic liquids, or a mixture of any said mediums.

Preferred polar protic solvents are water; alcohols such as methanol, ethanol, iso-propanol, butanol, linear aliphatic diols such as ethylene glycol, 1,3-propanediol, 1,4-butanediol, 1,5-pentanediol, 1,8-octanediol; branched diols such as 1,2-propanediol, 1,3-butanediol, 2,3-butanediol, 1,3-butanediol, 1,2-pentanediol, etohexadiol, p-menthane-3,8-diol, 2-methyl-2,4-pentanediol; and carboxylic acids such as formic acid and acetic acid.

Preferred polar aprotic solvents are dichloromethane, tetrahydrofuran, propylene carbonate and lactams such as N-methyl-2-pyrrolidone (NMP) and N-ethyl-2-pyrrolidone (NEP).

Preferred dipolar aprotic solvents are ketones such as acetone and methyl ethyl ketone (MEK); esters such as methyl acetate, ethyl acetate; N,N-methylformamide and dimethyl sulfoxide (DMSO).

Preferred ionic liquids are 1-ethyl-3-methylmidazolium chloride, 1-butyl-3-methylmidazolium chloride, 1-ethyl-3-methyl-imidazolium ethylsulfate, 1-ethyl-3-methyl imidazolium diethylphosphate, 1-ethyl-3-methyl-imidazolium dicyanamide, Tris-(2-hydroxyethyl)-methylammonium methylsulfate, 1-ethyl-3-methyl-imidazolium thiocyanate, 1-ethyl-3-methyl-imidazolium tetrafluoroborate, 1-ethyl-3-methyl-imidazolium trifluoromethanesulfonate, 1-ethyl-3-methyl-imidazolium bis (trifluoromethanesulfonyl)imide, 1-ethyl-3-methyl-imidazolium methylcarbonate and 1-butyl-3-methyl-imidazolium methylcarbonate, The most preferred ionic liquids are 1-ethyl-3-methylmidazolium chloride and 1-butyl-3-methylmidazolium chloride.

More preferably the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), or a mixture of any said solvents.

Most preferably the liquid medium is water.

pH of the zeta negative carboxylated nanodiamond suspension is typically at acidic region. That is, the pH is typically under 7.

In the present invention, the pH of the zeta negative carboxylated nanodiamond suspension is adjusted into neutral to basic region. That is, the pH of the suspension is adjusted to at least 7. Preferably the pH is adjusted to between 7 and 14, more preferably between 7 and 13.

The pH may be adjusted by any known method, e.g. by mixing the zeta negative carboxylated nanodiamond suspension and a base with ultrasonic treatment, with or without additional mechanical stirring.

The pH of the zeta negative carboxylated nanodiamond suspension may be adjusted with any suitable weak or strong base, such as Brönsted or Lewis bases. Preferably the pH is adjusted with ammonium hydroxide, ammonia, $NaH_4OH$, methyl amine, diethyl amine, pyridine, tri-methyl ammonia, lithium hydroxide (LiOH), sodium hydroxide (NaOH), potassium hydroxide (KOH), barium hydroxide ($Ba(OH)_2$), caesium hydroxide (CsOH), strontium hydroxide ($Sr(OH)_2$), calcium hydroxide ($Ca(OH)_2$), rubidium hydroxide (RbOH), more preferably ammonium hydroxide, ammonia, $NaH_4OH$, NaOH, KOH, and most preferably with ammonium hydroxide.

The pH of the zeta negative carboxylated nanodiamond suspension may be lowered if necessary with an acid, such as strong or weak acid, however in the way that the final pH of the suspension is at least 7.

Prior the pH adjustment, zeta potential of the zeta negative carboxylated nanodiamond suspension is over −30 mV measured at pH from 3 to 5, preferably over −35 mV at pH from 3 to 5, more preferably over −40 mV at pH from 3 to 5.

In a preferred embodiment, before the beads milling of the pH adjusted zeta negative carboxylated nanodiamond suspension, the zeta negative carboxylated nanodiamond suspension is subjected to a pre-treatment, preferably to a pre-treatment that lowers the intermolecular interactions of the zeta negative carboxylated nanodiamonds. Preferably the pre-treatment method is ultrasonication. Any typical ultrasonic device known by a skilled person may be used.

The zeta negative carboxylated nanodiamond suspension may be pre-treated before the pH adjustment, after the pH adjustment, or during the pH adjustment. Preferably the zeta negative carboxylated nanodiamond suspension is pre-treated with ultrasonication during the pH adjustment.

After the pH adjustment, and optional pre-treatment of the zeta negative carboxylated nanodiamond suspension, the suspension is subjected to beads milling.

Beads milling, or bead milling, is a commonly used term and known for a skilled person.

A beads mill is a type of a mechanical grinder. It is a cylindrical device used in grinding (or mixing) various materials. The mills are filled with the material to be ground and grinding media. Different materials are used as grinding media, including ceramic balls, flint pebbles and stainless steel balls. An internal cascading effect reduces the material to a fine powder. Beads mills can operate continuously or periodically, and can grind various materials either wet or dry.

Beads mill apparatuses can be operated with pass or re-circulation method. In the pass method the material is fed to the mill at one end and discharged at the other end. In the re-circulation method the material to be grinded circulates in the system until required particle size is obtained. The smaller the grinding media particles are, the smaller is the particle size of the final product. At the same time, the grinding media particles should be larger than the largest pieces of the material to be ground.

A grinding chamber of a beads mill can also be filled with an inert shield gas, such as nitrogen, that does not react with the material being ground, to prevent oxidation or explosive reactions that could occur with ambient air inside the mill.

The beads for the beads mill are chosen so that the milled particles will have a suitable diameter. In the present invention the beads mill is run with beads having diameter preferably from 10 μm to 100 μm, more preferably from 20 to 50, and most preferably 30 μm.

The beads milling is run until a suitable particle size is obtained. In the present invention obtained zeta negative carboxylated nanodiamond particles in the dispersion are substantially in a single digit form.

In a preferred embodiment beads milling of the pH adjusted zeta negative carboxylated nanodiamond suspension is assisted by ultrasonication. That is, the pH adjusted zeta negative carboxylated nanodiamond suspension is simultaneously beads milled and treated with ultrasonication. Combined beads milling and ultrasonication is also known as a beads assisted sonic disintergration process (BASD process). BASD apparatuses are commercially available. The ultrasonication can be kept on during the whole milling or switched off at any stage, and optionally switched on again.

The zeta negative single digit carboxylated nanodiamond dispersions obtained from the beads mill process have an average primary particle size distribution (D90) from 2 nm to 30 nm, preferably from 2 nm to 20 nm, more preferably 2 to 12 nm, most preferably from 3 nm to 8 nm.

Zeta potential of the obtained zeta negative single digit carboxylated nanodiamond dispersion is over −35 mV, preferably over −37 mV, more preferably over −40 mV and even more preferably over −50 mV measured at pH higher than 7.

Zeta potential of the obtained zeta negative single digit carboxylated nanodiamond dispersion is preferably over −60 mV, and more preferably over −70 mV, measured at pH higher than 8.5.

The zeta negative single digit carboxylated nanodiamond dispersion is stable when the zeta potential is over −37 mV measured at pH higher than 7.

Concentration of the zeta negative single digit carboxylated nanodiamond particles in the obtained dispersion is over 1 wt-%, preferably over 2 wt-%, more preferably between 2 and 10 wt-%, most preferably between 3 and 8 wt-%.

pH of the obtained zeta negative single digit carboxylated nanodiamond dispersion may be basic, neutral or acidic. Preferably the pH is from 4.5 to 14, preferably from 5 to 13, more preferably from 7 to 13.

The obtained zeta negative single digit carboxylated nanodiamond dispersion may be further processed. pH of the dispersion may be adjusted. The pH may be adjusted, depending on the pH of the dispersion, to acidic region or to basic region or to neutral. Preferably the pH is adjusted between 8 and 12, more preferably between 9 and 12, most preferably between about 10 and about 11. The pH can be adjusted with any suitable weak or strong base or acid. The dispersion may also be centrifuged, filtered or nanodiamond concentration can be adjusted by evaporation or dilution.

With the method of the present invention beads milling of zeta negative carboxylated nanodiamond suspension is performed without problems caused by clogging of the beads mill. By adjusting pH of zeta negative carboxylated nanodiamond suspension into neutral to alkaline region by base additives, nanodiamond carboxylic acid functions are blocked from chemo-mechanical reduction to their respective hydroxyl groups during beads milling process. As no reduction takes place, the beads milling to produce highly zeta negative nanodiamond single digit dispersions can be carried out successfully. As the nanodiamond carboxylic acid functions are blocked from reduction, highly zeta negative, single digit nanodiamond dispersions in high concentrations can be produced by the process of the present invention.

In a second aspect of the present invention there is provided a zeta negative single digit carboxylated nanodiamond dispersion comprising zeta negative single digit carboxylated nanodiamond particles and a liquid medium.

More particularly there is provided a zeta negative single digit carboxylated nanodiamond dispersion comprising zeta negative single digit carboxylated nanodiamond particles and a liquid medium, wherein
i) zeta potential of the zeta negative single digit carboxylated nanodiamond dispersion is over −37 mV measured at pH higher than 7,
ii) zeta negative single digit carboxylated nanodiamond particle concentration is over 2 wt-% in the dispersion,
iii) D90 average primary particle size distribution of the zeta negative single digit carboxylated nanodiamond particles is from 2 nm to 12 nm.

The liquid medium of the dispersion may be any suitable liquid medium. The liquid medium is preferably selected from the group consisting of polar protic solvents, polar aprotic solvents, dipolar aprotic solvents, ionic liquids, or a mixture of any said mediums.

Preferred polar protic solvents are water; alcohols such as methanol, ethanol, iso-propanol, butanol, linear aliphatic diols such as ethylene glycol, 1,3-propanediol, 1,4-butanediol, 1,5-pentanediol, 1,8-octanediol; branched diols such as 1,2-propanediol, 1,3-butanediol, 2,3-butanediol, 1,3-butanediol, 1,2-pentanediol, etohexadiol, p-menthane-3,8-diol, 2-methyl-2,4-pentanediol; and carboxylic acids such as formic acid and acetic acid.

Preferred polar aprotic solvents are dichloromethane, tetrahydrofuran, propylene carbonate and lactams such as N-methyl-2-pyrrolidone (NMP) and N-ethyl-2-pyrrolidone (NEP).

Preferred dipolar aprotic solvents are ketones such as acetone and methyl ethyl ketone (MEK); esters such as methyl acetate, ethyl acetate; N,N-methylformamide and dimethyl sulfoxide (DMSO).

Preferred ionic liquids are 1-ethyl-3-methylmidazolium chloride, 1-butyl-3-methylmidazolium chloride, 1-ethyl-3-methyl-imidazolium ethylsulfate, 1-ethyl-3-methyl imidazolium diethylphosphate, 1-ethyl-3-methyl-imidazolium dicyanamide, tris-(2-hydroxyethyl)-methylammonium methylsulfate, 1-ethyl-3-methyl-imidazolium thiocyanate, 1-ethyl-3-methyl-imidazolium tetrafluoroborate, 1-ethyl-3-methyl-imidazolium trifluoromethanesulfonate, 1-ethyl-3-methyl-imidazolium bis (trifluoromethanesulfonyl)imide, 1-ethyl-3-methyl-imidazolium methylcarbonate and 1-butyl-3-methyl-imidazolium methylcarbonate, The most preferred ionic liquids are 1-ethyl-3-methylmidazolium chloride and 1-butyl-3-methylmidazolium chloride.

More preferably the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), or a mixture of any said solvents.

Most preferably the liquid medium is water.

Zeta potential of the zeta negative single digit carboxylated nanodiamond dispersion is over −37 mV, more preferably over −40 mV and most preferably over −50 mV measured at pH higher than 7.

Zeta potential of the zeta negative single digit carboxylated nanodiamond dispersion is preferably over −60 mV, and more preferably over −70 mV, measured at pH higher than 8.5.

The zeta negative single digit carboxylated nanodiamond dispersion is stable when the zeta potential is over −37 mV measured at pH higher than 7.

Concentration of the zeta negative single digit carboxylated nanodiamond particles in the dispersion is over 2 wt-%, more preferably between 2 and 10 wt-%, and most preferably between 3 and 8 wt-%.

D90 average primary particle size distribution of the zeta negative single digit carboxylated nanodiamond particles is preferably from 3 nm to 8 nm.

pH of the zeta negative single digit carboxylated nanodiamond dispersion may be basic, neutral or acidic. Preferably the pH is from 4.5 to 14, preferably from 5 to 13, more preferably from 7 to 13.

In the following the invention will be described in more detail by means of examples. The purpose of the examples is not to restrict the scope of the claims.

EXAMPLES

Materials and Apparatuses
Ultrasonic device: Hielscher UP400S (from company Hielscher)
Beads mill equipment: Bühler PML2 (from company Bühler GmbH, Germany)

Particle size and zeta potential measurement tool: Malvern Zetasizer NanoZS.

Zeta negative carboxylated nanodiamonds: uDiamond® Molto Vox nanodiamond powder (commercially available from company Carbodeon). Said commercial zeta negative carboxylated nanodiamond powder acid value was determined to 34.7, as a service from Ketek Oy, Finland.

The nanodiamond acid value was determined by titration. Every sample measurement was conducted twice, with a sample size of 1.5 g per titration. The titrations were carried out with automated Metrohm titrator. Determination of acid functions: Solid samples were weighted accurately (1.5 g). The samples were dispersed into 75 ml of neutralized ethanol (water content 0.5 wt. %), using Hielscher 400 W ultrasonic unit. The prepared samples were titrated with 0.1 M KOH (in methanol), using phenoliftalene as an indicator. The samples were treated continuously with Argon gas flow during the titration. The titration end point was detected by using an indicator and with potentiometric means, using Methrohm Solvotrode electrode and drawing a titration curve.

The EDX analysis (Zeiss Ultra Plus Gemine) revealed the applied nanodiamond material is essentially free of nitrogen contained surface functions. The applied acceleration voltage was 20 kV.

N-Methyl-2-pyrrolidone (NMP), Assay ≥99.5% was purchased from VWR Chemicals/Prolabo, Assay ≥99.5%.

1-Ethyl-2-pyrrolidone (NEP), Assay ≥98% was purchased from AppliChem Panreac.

The product zeta potential values were measured of samples diluted to 0.1 wt-%. The product particle size distributions were measured of samples diluted to 0.5 wt-%.

The solvent based nanodiamond dispersion moisture contents were determined by Karl Fischer method at Ketek Oy, Finland.

Reference Example—Beads Milling of Zeta Negative Carboxylated Nanodiamond Suspension without pH Adjustment Prior the Milling Test 1

Deionized water (300 g) and uDiamond Molto Vox zeta negative carboxylated nanodiamond powder (25 g) having zeta potential −47 mV were mixed together using a magnetic stirrer. As a pre-treatment the mixture was subjected to ultrasonic treatment in a vessel for 30 min with 100% intensity in order to reduce the size of nanodiamond agglomerates. The ultrasonic treatment was carried out without any mechanical mixing. A greyish, 7.69 wt-% nanodiamond suspension was formed, and a substantial fraction of nanodiamond material was subprecipitated to the vessel bottom right after ending the ultra-sonic treatment.

The resulting nanodiamond suspension was then subjected to beads milling. Already at the initial milling phase, the mill pressure levels started to rise, indicating of a possibility of clogging of the beads mill sieve system. In order to reduce the inside pressure, the mill was run without any pumping for 5 minutes time and the sieve was cleaned. As the milling was continued, the pressure started to rise again, and the milling had to be stopped after 20 minutes time.

Test 2

Deionized water (345 g) and uDiamond Vox zeta negative carboxylated nanodiamond powder (25 g) having zeta potential −47 mV were mixed together using a magnetic stirrer the resulted mixture was subjected to ultrasonic treatment as pre-treatment for 30 min under magnetic stirring.

The resulting 6.8 wt-% nanodiamond suspension was then subjected to beads milling. Prior milling itself the mill all the possible oxygen was removed away by pumping water through the mill. The nanodiamond suspension (370 g) was added slowly, within 10 minutes period into the system, and the pump speed was adjusted to only 10% (3 kg/h), and the nanodiamond slurry was circulated through an ultrasonic station. After the whole mixture had been added the pump speed was increased to 15% (5 kg/h), and the actual processing was commenced.

During beads milling, analytical samples were taken out on regular 10 minutes intervals for direct particle size and zeta potential measurement.

During the beads mill processing, the zeta potential rises from negative to positive values (FIG. 1). This is due to reduction of zeta-negative carboxylic acid functions into zeta-positive hydroxyl groups.

Figure 2:
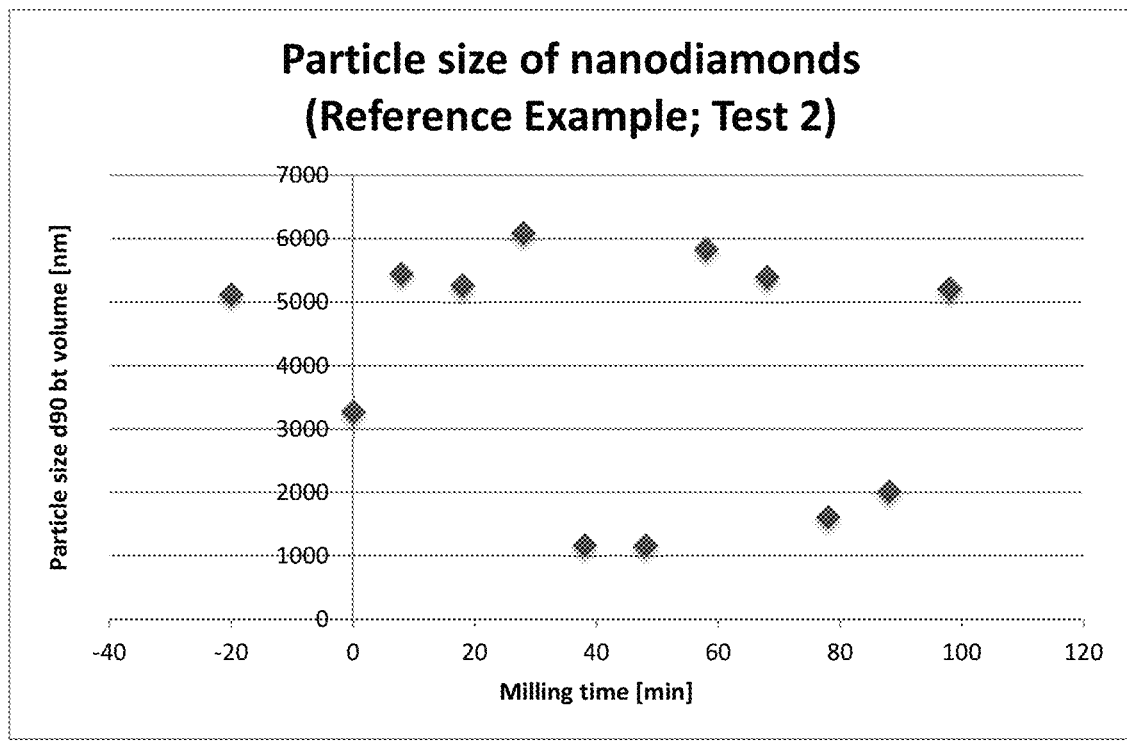
FIG. 2 shows particle size of carboxylated nanodiamonds during beads milling according to a reference method.

Also particle size distribution of the carboxylated nanodiamond suspension changes during the beads milling. Initially, a decrease in particle size distribution could be detected, but start to rise again as the processing was continued (FIG. 2). This is due to agglomeration caused by formation of zeta positive hydroxyl functions.

Figure 3:
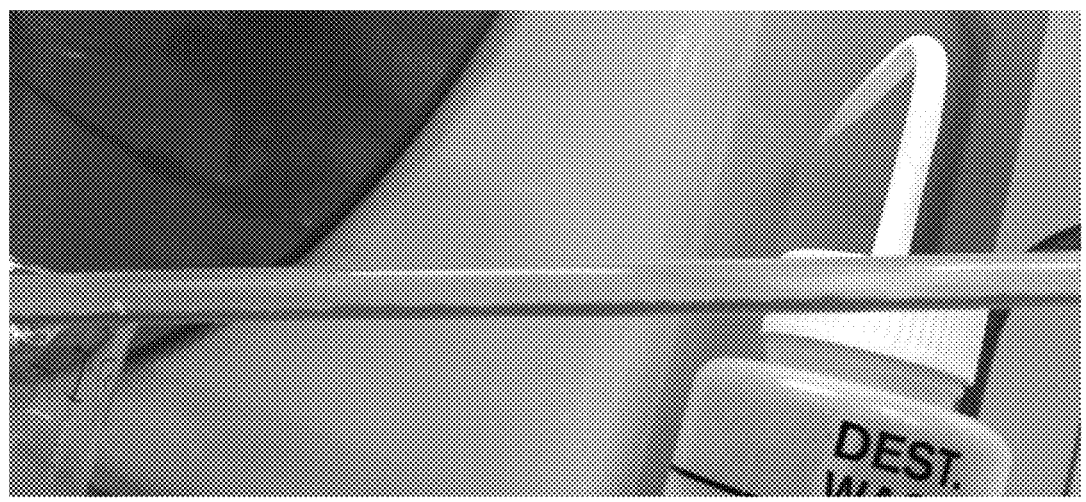
FIG. 3 shows nanodiamond precipitation in a hose of a beads mill apparatus in a reference method.
Figure 4:
FIG. 4 shows clogging of a sieve system of a beads mill apparatus in a reference method.

The agglomeration can be seen in FIG. 3 which shows nanodiamond precipitation in a hose of the beads mill apparatus. FIG. 4 shows clogging of sieve system of the beads mill apparatus.

The clogging occurs because reduction of carboxylic acid functions into hydroxyl groups takes place. As hydroxyl groups carry positive zeta potential agglomeration takes place.

Example (According to the Present Invention)—Beads Milling of pH Adjusted Zeta Negative Carboxylated Nanodiamond Suspension 1000 ml of deionized water was mixed with 0.25 ml of 28% ammonia in water in order to adjust pH of the resulting ammonia suspension into alkaline region. The received suspension initial pH was measured to 10.3. 180 g of prepared ammonia suspension was introduced into the mill for pre-wetting the beads and to fill the hoses of beads mill apparatus.

525 g of deionized water and 45 g of zeta negative carboxylated uDiamond Molto Vox nanodiamond powder were mixed with a conventional magnetic stirrer to form a nanodiamond suspension. The suspension initial pH was 3.7. The suspension pH was adjusted by adding 1.5 ml of 28% aqueous ammonia, followed by ultrasonic treatment for 30 minutes, using H14 blade and 40% amplitude. The suspension was stirred with conventional magnetic stirrer (100 rpm), with simultaneous cooling with an ice-bath. The resulting 7.9 wt-% nanodiamond suspension pH was 9.0.

Said suspension was then subjected to beads milling, using 30 micron zirconia beads. The milling was initialized with 10% pump speed (3 kg/h), for a 20 minutes period, circulating the suspension simultaneously through an ultrasonic station. After 20 minutes processing time, the pump speed was increased to 15% (5 kg/h), with continued ultrasonic treatment. The milling was continued until 90 minutes total processing time was reached.

Figure 5:
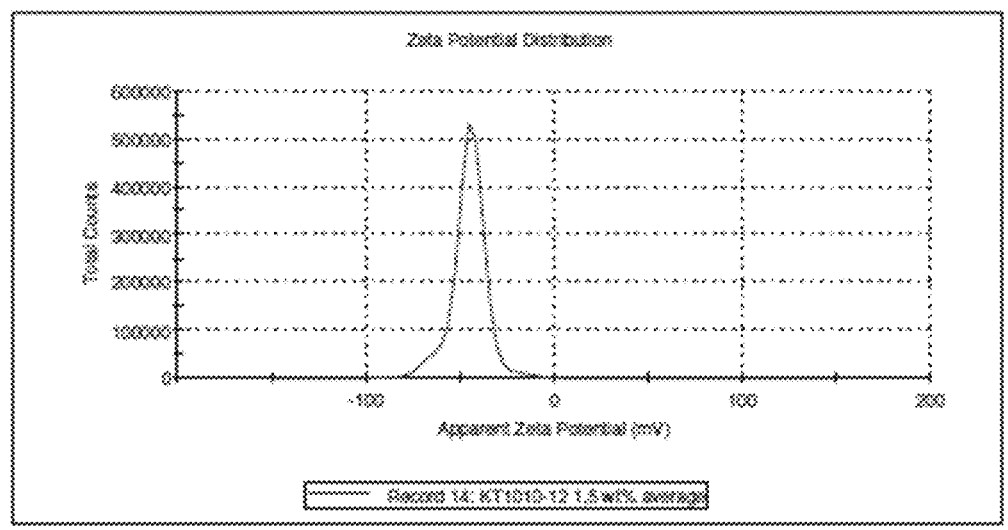
FIG. 5 shows zeta potential of carboxylated nanodiamond dispersion after beads milling according to the present invention.
Figure 6:
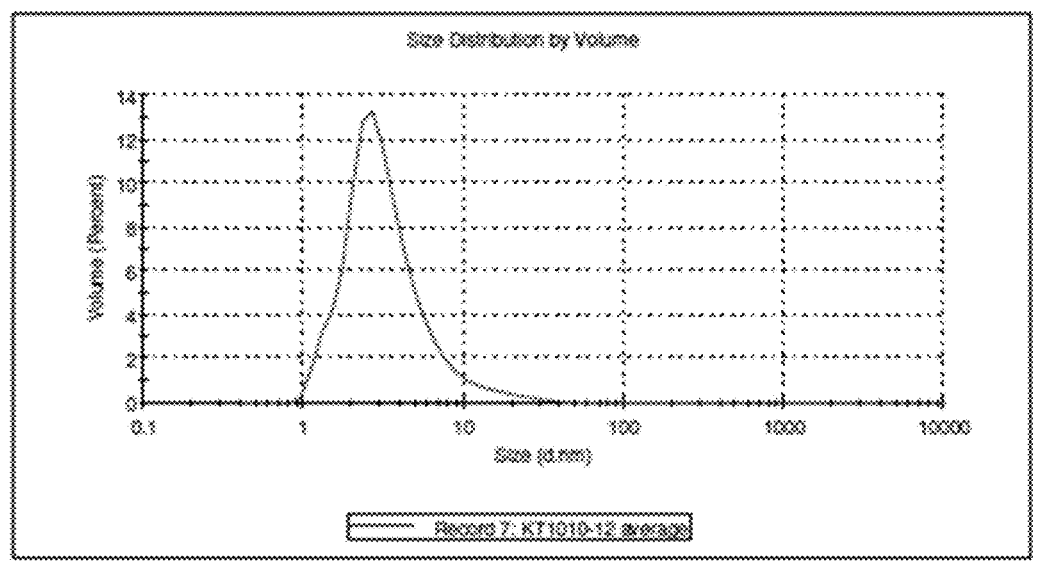
FIG. 6 shows particle size distribution of carboxylated nanodiamond dispersion after beads milling according to the present invention.

The resulting zeta negative single digit carboxylated nanodiamond dispersion (marked as sample KT-1010-12) final pH was 8.5 and the zeta potential was measured to −45.2 mV (FIG. 5). The particle size distribution was the following: D10 1.63 nm; D50 2.89 nm; and D90 6.61 nm. FIG. 6 shows particle size distribution of carboxylated nanodiamond dispersion after beads milling.

Example (According to the Present Invention)—Highly Zeta Negative Single Digit Aqueous Nanodiamond Dispersion Zeta Potential Stability and Tunability within pH Range of 2 to 13

In Table 1 are disclosed measured zeta potentials of single digit carboxylated nanodiamond dispersion at pH range from 2 to 13. pH of the dispersion was controlled with either HCl or NaH$_4$OH and treated with sonication for 30 min. The zeta potentials were measured from diluted 0.1 wt-% nanodiamond samples. The zeta negative single digit carboxylated nanodiamond dispersion is stable when the zeta potential is −37.5 mV or over −37.5 mV. By fine-tuning the nanodiamond dispersion pH into a region of around 10 to 11, it is possible to reach zetapotential values exceeding −70 mV, also at this very low nanodiamond concentration. At higher nanodiamond concentrations, the results will be further elevated.

TABLE 1

| pH | zeta potential (mV) |
|---|---|
| 2.2 | 13.9 |
| 3.0 | 0.8 |
| 4.2 | −28.7 |
| 5.1 | −37.9 |
| 6.8 | −46.3 |
| 7.0 | −53.7 |
| 7.4 | −54.8 |
| 8.8 | −61.9 |
| 9.8 | −70.3 |
| 10.9 | −70.7 |
| 12.0 | −62.1 |
| 12.4 | −48.4 |

Figure 7:
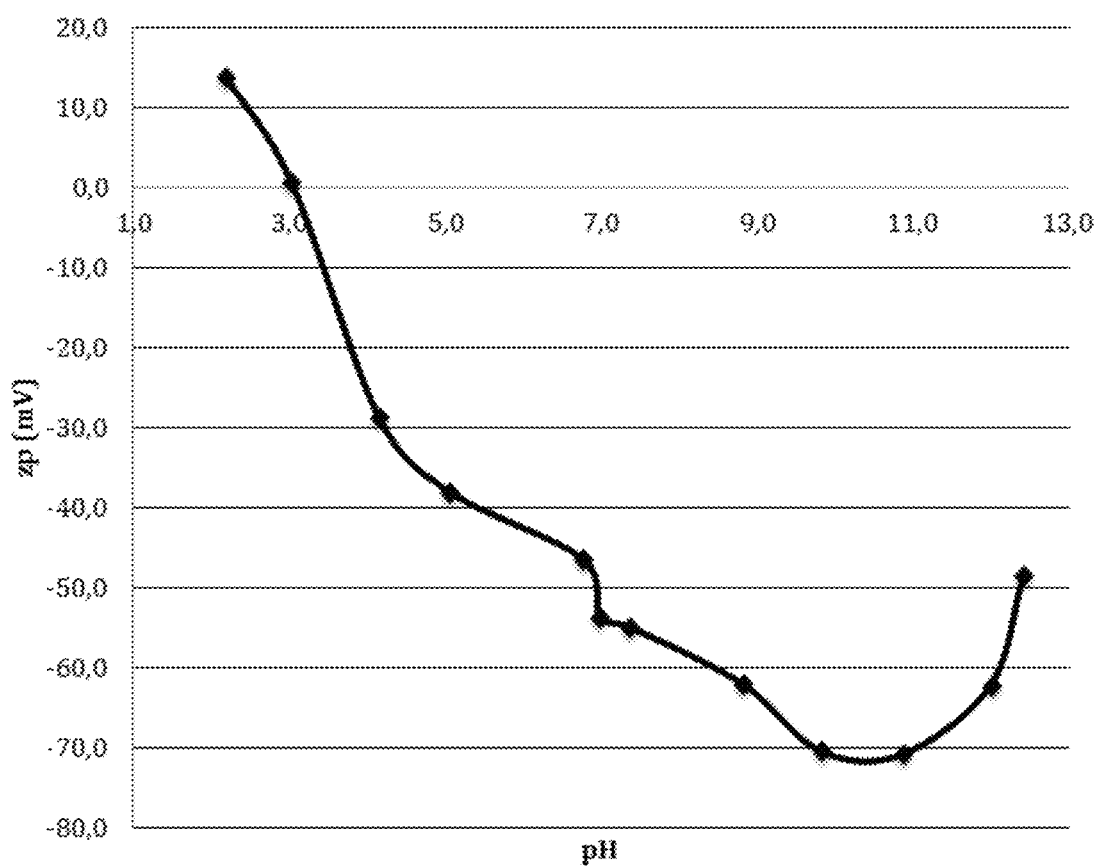
FIG. 7 shows dispersion stability of pH adjusted carboxylated nanodiamond dispersion samples within pH range of 2 to 13 according to present invention.

The dispersion stability of pH adjusted carboxylated nanodiamond dispersion samples within pH range of 2 to 13 is featured in FIG. 7.

Example (According to the Present Invention)—Preparation of Highly Zeta Negative 2.2 wt. % Single Digit Carboxylated Nanodiamond Dispersion in NMP The evaporator water bath was preheated up to 45° C. 190 g of 5 wt. % aqueous highly zeta negative, carboxylic acid functionalized nanodiamond dispersion was weighted into 2 liter round bottomed flask, followed by addition of 490 g of NMP solvent. The resulting mixture was evaporated in the following sequences: 1000 mbar down to 200 mbar (in three minutes), down to 100 mbar during additional one minute evaporation, down to 50 mbar in still another minute of evaporation, and down to 15 mbar by 10 minute total evaporation time. Said steps were carried out without placing the flask into evaporator water bath. Thereafter, evaporation was continued by placing the flask into water bath (T=45° C.), rising the water bath temperature simultaneously into 80° C. during 25 minutes. The evaporation was continued for 8 minutes at 80° C. The resulting dispersion was weighted to 466.4 g. Resulting dispersion water content was measured to 0.49 wt. % by Karl Fischer titration. The oven dried sample revealed that produced NMP based nanodiamond dispersion nanodiamond concentration is 2.2 wt. %

The dispersion exhibited the following particle size distribution: D10: 3.37 nm; D50: 6.13 nm; D90: 14.1 nm. The dispersion zeta potential was measured to −48.3 mV.

Example (According to the Present Invention)—Preparation of Highly Zeta Negative 1.1 wt. % Single Digit Carboxylated Nanodiamond Dispersion in NEP The evaporator water bath was preheated up to 45° C. 200 g of 5 wt. % aqueous highly zeta negative, carboxylic acid functionalized nanodiamond dispersion was weighted into 4 liter round bottomed flask, followed by addition of 200 g of ion exchanged water and 990 g of NMP solvent. The resulting mixture was stirrer vigorously for 5 minutes time. Then, the mixture was evaporated in the following sequences: 1000 mbar down to 200 mbar (in three minutes), down to 100 mbar during additional one minute evaporation, down to 50 mbar in still another minute of evaporation, and to less than 20 mbar by 18 minute total evaporation time. Said steps were carried out without placing the flask into evaporator water bath. Thereafter, evaporation was continued by placing the flask into water bath (T=45° C.), rising the water bath temperature during 10 minutes to 65° C. Then, the evaporation was continued until reaching the total evaporation time of 50 minutes.

The resulting dispersion was weighted to 932.5 g. Resulting dispersion water content was measured to 0.19 wt. % by Karl Fischer titration. The oven dried sample revealed that produced NMP based nanodiamond dispersion nanodiamond concentration is 1.1 wt. %

The dispersion exhibited the following particle size distribution: D10: 2.35 nm; D50: 3.57 nm; D90: 6.75 nm. The dispersion zeta potential was measured to −63.8 mV.

The invention claimed is:

1. A method for producing an aqueous zeta negative single digit carboxylated nanodiamond dispersion, the method comprising adjusting pH of an aqueous zeta negative carboxylated nanodiamond suspension to at least 7, and subjecting the pH adjusted aqueous suspension to beads milling, wherein zeta potential of the aqueous zeta negative carboxylated nanodiamond suspension prior to the pH adjustment is more negative than −30 mV measured at pH from 3 to 5 at a nanodiamond concentration of at least 0.1 wt %.

2. The method according to claim 1, wherein the pH is adjusted to between 7 and 14.

3. The method according to claim 1, wherein the zeta negative carboxylated nanodiamond suspension is pretreated before the beads milling.

4. The method according to claim 3, wherein the pretreatment is ultrasonication.

5. The method according to claim 1, wherein the pH is adjusted with a Brönsted or a Lewis base selected from the group consisting of ammonium hydroxide, ammonia, NaH$_4$OH, methyl amine, diethyl amine, pyridine, tri-methyl ammonia, lithium hydroxide (LiOH), sodium hydroxide (NaOH), potassium hydroxide (KOH), barium hydroxide (Ba(OH)$_2$), caesium hydroxide (CsOH), strontium hydroxide (Sr(OH)$_2$), calcium hydroxide (Ca(OH)$_2$), and rubidium hydroxide (RbOH).

6. The method according to claim 1, wherein the beads milling of the pH adjusted suspension is assisted by ultrasonication.

7. The method according to claim 1, wherein zeta potential of the zeta negative single digit carboxylated nanodiamond dispersion is more negative than −35 mV, measured at pH higher than 7.

8. The method according to claim 1, wherein zeta potential of the zeta negative single digit carboxylated nanodiamond dispersion is more negative than −60 mV, measured at pH higher than 8.5.

9. The method according to claim 1, wherein concentration of the zeta negative single digit carboxylated nanodiamond particles in the dispersion is greater than 1 wt-%.

10. The method according to claim 1, wherein D90 average primary particle size distribution of the zeta negative single digit carboxylated nanodiamond particles is from 2 nm to 30 nm.

* * * * *

UNITED STATES PATENT AND TRADEMARK OFFICE
CERTIFICATE OF CORRECTION

PATENT NO.       : 10,836,930 B2
APPLICATION NO.  : 15/916406
DATED            : November 17, 2020
INVENTOR(S)      : Vesa Myllymäki and Jesse Syrén It is certified that error appears in the above-identified patent and that said Letters Patent is hereby corrected as shown below:

On the Title Page

Item (72) The inventor name "Jesse Syrën" should be "Jesse Syrén"

Signed and Sealed this
Fifth Day of January, 2021

Andrei Iancu
*Director of the United States Patent and Trademark Office*